US008065419B2

(12) United States Patent
Vimpari et al.

(10) Patent No.: US 8,065,419 B2
(45) Date of Patent: Nov. 22, 2011

(54) METHOD AND APPARATUS FOR A KEEP ALIVE PROBE SERVICE

(75) Inventors: Markku Vimpari, Oulu (FI); Jukka Alakontiola, Oulu (FI)

(73) Assignee: Core Wireless Licensing S.a.r.l., Luxembourg (DE)

( * ) Notice: Subject to any disclaimer, the term of this patent is extended or adjusted under 35 U.S.C. 154(b) by 130 days.

(21) Appl. No.: 12/489,985

(22) Filed: Jun. 23, 2009

(65) Prior Publication Data
US 2010/0325306 A1 Dec. 23, 2010

(51) Int. Cl.
G06F 15/16 (2006.01)
(52) U.S. Cl. ......................... 709/227; 709/229
(58) Field of Classification Search .......... 709/227, 709/229, 234
See application file for complete search history.

(56) References Cited

U.S. PATENT DOCUMENTS

| 6,052,439 | A | 4/2000 | Gerszberg et al. |
| 6,160,795 | A | 12/2000 | Hosemann |
| 7,185,076 | B1 | 2/2007 | Novaes et al. |
| 7,349,980 | B1 | 3/2008 | Darugar et al. |
| 7,376,092 | B2 | 5/2008 | Yajnik et al. |
| 7,460,556 | B2 | 12/2008 | Duggirala et al. |
| 7,627,603 | B2 | 12/2009 | Rosenblum et al. |
| 7,680,804 | B2 | 3/2010 | Upendran et al. |
| 2002/0069157 | A1 | 6/2002 | Jordan |
| 2002/0165916 | A1 | 11/2002 | Kitamura |
| 2004/0078450 | A1 | 4/2004 | Chen et al. |
| 2005/0021622 | A1 | 1/2005 | Cullen |
| 2005/0188098 | A1* | 8/2005 | Dunk .................. 709/232 |
| 2005/0246186 | A1 | 11/2005 | Nikolov |
| 2005/0273518 | A1 | 12/2005 | Patrick et al. |
| 2006/0036679 | A1 | 2/2006 | Goodman et al. |
| 2006/0136256 | A1 | 6/2006 | Roots et al. |
| 2006/0146991 | A1 | 7/2006 | Thompson et al. |
| 2006/0155857 | A1 | 7/2006 | Feenan, Jr. et al. |
| 2007/0005711 | A1 | 1/2007 | Hassounah et al. |
| 2007/0097994 | A1 | 5/2007 | Samdadiya et al. |
| 2007/0223408 | A1* | 9/2007 | Thielke et al. ............ 370/310 |
| 2007/0237139 | A1 | 10/2007 | Garcia-Martin et al. |
| 2007/0291658 | A1 | 12/2007 | Knapik et al. |
| 2008/0086689 | A1 | 4/2008 | Berkley et al. |
| 2008/0250213 | A1 | 10/2008 | Holt |
| 2008/0285540 | A1 | 11/2008 | Burckart et al. |

(Continued)

FOREIGN PATENT DOCUMENTS

EP 1 107 519 A2 6/2001

(Continued)

OTHER PUBLICATIONS

International search report and written opinion for corresponding international application No. PCT/FI2010/050289 dated Jun. 15, 2010, pp. 1-16.

(Continued)

Primary Examiner — Frantz Jean
(74) Attorney, Agent, or Firm — Ditthavong Mori & Steiner, P.C.

(57) ABSTRACT

An approach is provided for determining an optimal keep-alive time period. A request is received from one of a plurality of user equipments for a keep-alive timer value. A specific network information related to a network serving the one user equipment is determined. A keep-alive timer value is determined based on the network information and advantageously using statistical analysis.

14 Claims, 6 Drawing Sheets

U.S. PATENT DOCUMENTS

| | | | |
|---|---|---|---|
| 2008/0294794 A1 | 11/2008 | Darugar et al. | |
| 2009/0201857 A1 | 8/2009 | Daudin et al. | |
| 2009/0319670 A1* | 12/2009 | Kang | 709/227 |
| 2010/0185757 A1 | 7/2010 | Boberg et al. | |
| 2010/0185773 A1* | 7/2010 | Dunk | 709/227 |
| 2010/0322236 A1 | 12/2010 | Vimpari et al. | |
| 2010/0325260 A1 | 12/2010 | Halla-Aho et al. | |

FOREIGN PATENT DOCUMENTS

| | | |
|---|---|---|
| WO | WO 2005/104477 A1 | 11/2005 |
| WO | WO 2006/125474 A1 | 11/2006 |
| WO | WO 2007/104360 A1 | 9/2007 |

OTHER PUBLICATIONS

International search report and written opinion for corresponding international application No. PCT/FI2010/050474 dated Sep. 28, 2010, pp. 1-13.

Bartel, M. et al.: XML-Signature Syntax and Processing. W3C Recommendation 2002, Published: Feb. 12, 2002, Accessed: Oct. 14, 2009, pp. 1-59, http://www.w3.org/TR/2002/REC-xmldsig-core-20020212/.

Bradner, S.: Key Words for use in RFCs to Indicate Requirement Levels. Network Working Group, Harvard University, Mar. 1997, Accessed: Oct. 14, 2009, pp. 1-3, http://www.ietf.org/rfc/rfc2119.txt.

Dedinski, I. et al.: Cooperative Keep-Alives: An Efficient Outage Detection Algorithm for P2P Overlay Networks (Abstract). University of Passau, Passau, Germany, Published: Sep. 2-5, 2007, Accessed: Oct. 14, 2009, pp. 140-150, http://ieeexplore.ieee.org/xpl/freeabs_all.jsp?arnumber=4343474.

Harrington, D. et al.: An Architecture for Describing Simple Network Management Protocol (SNMP) Management Frameworks. Network Working Group, The Internet Society (2002), Dec. 2002, Accessed: Oct. 14, 2009, pp. 1-65, http://tools.ietf.org/html/rfc3411.

Jonsson, J. et al.: Public-Key Cryptography Standards (PKCS) #1: RSA Cryptography Specifications Version 2.1. RSA Laboratories, Feb. 2003, Accessed: Oct. 14, 2009, pp. 1-68, http://www.ietf.org/rfc/rfc3447.txt.

Paterson, I. et al.: XEP-0124: Bidirectional-streams Over Synchronous HTTP (BOSH). XMPP Standards Foundation, Draft Version 1.8, Last Updated: Apr. 30, 2009, Accessed: Oct. 14, 2009, pp. 1-42, http://xmpp.org/extensions/xep-0124.html.

Paterson, I. et al.: XEP-0189: Public Key Publishing. XMPP Standards Foundation, Experimental Version 0.9, Last Updated: Mar. 8, 2009, Acessed: Oct. 14, 2009, pp. 1-22, http://xmpp.org/extensions/xep-0189.html.

Paterson, I. et al.: XEP-0206: XMPP Over BOSH. XMPP Standards Foundation, Draft Version 1.2, Last Updated: Oct. 29, 2008, Accessed: Oct. 14, 2009, pp. 1-13, http://xmpp.org/extensions/xep-0206.html.

Presuhn, R. et al.: Management Information Base (MIB) for the Simple Network Management Protocol (SNMP). Network Working Group, The Internet Society (2002), Dec. 2002, Acessed: Oct. 14, 2009, pp. 1-27, http://tools.ietf.org/html/rfc3418.

Office action for related U.S. Appl. No. 12/487,197 dated Apr. 18, 2011, pp. 1-132.

Office action for related U.S. Appl. No. 12/487,184 dated Jun. 29, 2011, pp. 1-31.

Office action for related U.S. Appl. No. 12/487,192 dated Apr. 27, 2011, pp. 1-26.

* cited by examiner

US 8,065,419 B2

METHOD AND APPARATUS FOR A KEEP ALIVE PROBE SERVICE

BACKGROUND

Service providers and device manufacturers are continually challenged to deliver value and convenience to consumers by, for example, providing compelling network services. Important differentiators in the industry are application and network services as well as connectivity of the services. In particular, keep-alive timers are used by internet protocol applications in devices to send keep-alive packets to keep a connection open to the server on public internet or the device connected to an access network. Inadequate keep-alive timer values can lead to the loss of connections or when sent too often, into excessive power consumption.

Some Example Embodiments

Therefore, there is a need for an approach for informing devices of optimal keep-alive timer values.

According to one embodiment, a method comprises receiving a request from one of a plurality of user equipments for a keep-alive timer value. The method also comprises determining a specific network information related to a network serving the one user equipment. The method further comprises determining the keep-alive timer value based on the network information.

According to another embodiment, an apparatus comprising at least one processor, and at least one memory including computer program code, the at least one memory and the computer program code configured to, with the at least one processor, cause the apparatus to receive a request from one of a plurality of user equipments for a keep-alive timer value. The apparatus is further caused to determine a specific network information related to a network serving the one user equipment. The request specifies network information related to a network serving the one user equipment. The apparatus is also caused to determine the keep-alive timer value based on the network information.

According to another embodiment, a computer-readable storage medium carrying one or more sequences of one or more instructions which, when executed by one or more processors, cause an apparatus to receive a request from one of a plurality of user equipments for a keep-alive timer value. The apparatus is further caused to determine a specific network information related to a network serving the one user equipment. The apparatus is also caused to determine the keep-alive timer value based on the network information.

According to another embodiment, an apparatus comprises means for receiving a request from one of a plurality of user equipments for a keep-alive timer value. The apparatus further comprises means for determining a specific network information related to a network serving the one user equipment. The apparatus also comprises means for determining the keep-alive timer value based on the network information.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

A method, apparatus, and software for a keep-alive probe service are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
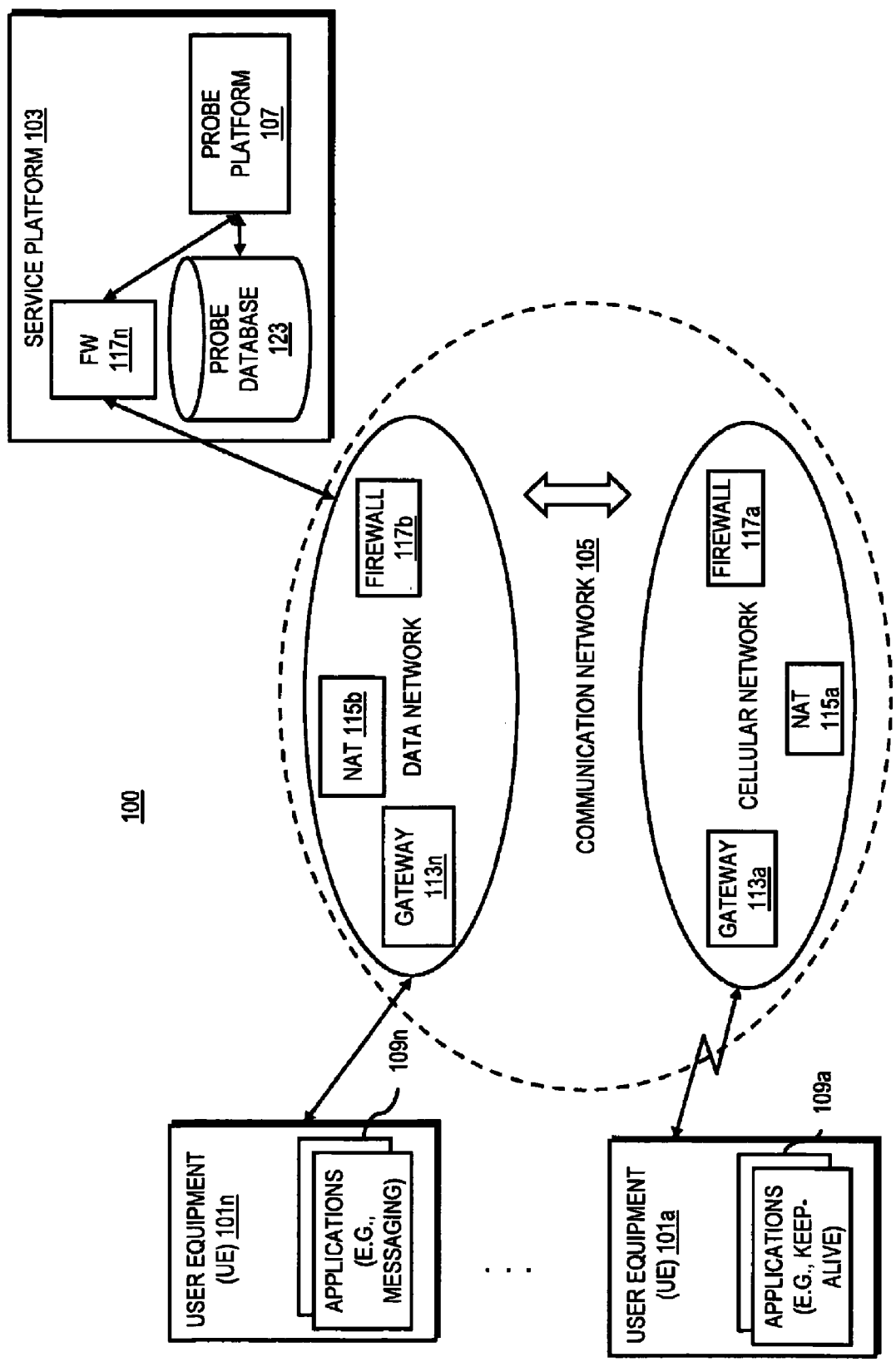
FIG. 1 is a diagram of a system capable of transmitting optimal keep-alive timer values, according to one embodiment.

FIG. 1 is a diagram of a system capable of transmitting optimal keep-alive timer values, according to one embodiment. Under the scenario of FIG. 1, a system 100 involves user equipment (UE) 101 having connectivity to a service platform 103 over a communication network 105. The service platform 103 can provide keep-alive time values for the UE 101 to stay connected to a network by utilizing a probe platform 107. A keep-alive application 109a on the UE 101 can access the probe platform 107 to receive the keep-alive timer values and to update the probing service. Other applications, such as a messaging application 109n or an e-mail application (not shown) can also be executed on the UE 101 and utilize the optimal keep-alive time value.

In one embodiment, services, like the messaging application 109n, use keep-alive timers to stay connected to a service platform 103. Various points (e.g., a gateway 113a-113n, a network address translation (NAT) 115a-115n, a firewall 117a-117n, etc.) of the network can drop a UE 101 connection. Each of these points can have different inactivity timer values, which can correspond to the keep-alive maximum timer values. In devices like a UE 101, it is advantageous to keep the keep-alive timer value longer. In some embodiments, the optimal value is close to the maximum time. On the route through the various points, the shortest inactivity timer of a route is the effective inactivity timer value. The timers along the route are different because different manufacturers make the different device points and different network administrators manage the different device points. In one embodiment, the UE 101 is a cellular device. In many cases, there is a firewall 117 or a NAT 115 between the cellular UE 101 connected to a cellular network 119 and a data network 121 (e.g. internet). In another embodiment, there is a firewall 117 or NAT 115 between a UE 101*n* and a service platform 103. Because a firewall 117 and a NAT 115 are stateful devices, each drops packets received from the public internet that are not belonging to any TCP stream or virtual UDP connection opened by a UE 101. In a wired local area networks, sending constant keep-alive packets marginally affects the power consumption of the UE 101. However, in a cellular network 119 setting, keep-alive timer settings can have a drastic affect on the standby life of a UE 101. For example a UE 101 with a continuous connection and a sub-optimal keep-alive timer value may have a standby time of 10 hours while a UE 101 with a continuous connection and an optimal keep-alive timer value may have a standby time of 4 days.

To address this problem, a system 100 of FIG. 1 introduces the capability to determine a statistically determined optimal keep-alive timer value for UEs 101 based on the connections of the UE 101. In this embodiment, UEs 101 can obtain information about optimal keep alive parameters using a keep-alive application 109*a*. In another embodiment, the UEs 101 are behind the same gateway 113. In one embodiment, a keep-alive application 109*a* of a UE 101 requests a keep-alive timer value for the network that the UE 101 is connected to. In this embodiment, a probe platform 107 responds to the keep-alive application 109*a* with a keep-alive timer value determined by processing information in a probe database 123. In one embodiment, if the probe database 123 has insufficient or stale information, the probe platform 107 can request that the UE 101 be a probe for gathering information.

In one embodiment, a connection includes a gateway 113, a NAT 115, a firewall 117, other connection devices, or a combination thereof. These connection devices can be used to connect a UE 101 to a service platform 103. Some applications (e.g., instant messaging or e-mail) on the UE 101 use connections that should be constantly live to receive updates from a service platform 103. Multiple devices can be used for routing a connection from a UE 101 to an endpoint service provider. Each of the devices may keep a connection alive for a certain period of time according to an inactivity timer value. If the connection of the UE 101 is inactive for longer than the inactivity timer value, the connection is dropped. The connection can be dropped by any one of these devices used in routing the connection. The connection devices can be more efficient with shorter inactivity timer values because the connection devices can reuse resources. However, a longer inactivity timer value would be advantageous to a UE 101 because it would mean less keep-alive packets need to be sent, saving power. The UE 101 can use a keep-alive timer value to send a packet (e.g., an empty packet, a data packet, etc.) to keep a connection alive. In some embodiments, the UE 101 can keep a connection alive for multiple applications 109 using a single keep-alive packet.

In one embodiment, the service platform 103 includes a probe database 123. The probe database 123 may contain information that can facilitate a probe platform 107 in determining a proper keep-alive timer value for a UE 101 that requests one. In one embodiment, the probe database 123 includes information about the specific communication network 105. For binding the connection from the UE 101 into the communication network specific information, the request from the UE 101 can include a mobile country code (MCC), a mobile network code (MNC), an internet protocol source address, a cellular identifier, a gateway (e.g., a gateway general packet radio service support node (GGSN)), an access point name, or the like. In one embodiment, an access point name (APN) can be used to identify a GPRS bearer service. In one embodiment, the probe database 123 includes data collected about the connections, such as keep-alive timer values from probes, and keep-alive timer values from probes that have lead to a dropped connection. Additionally, the probe database 123 can store historical and current keep-alive timer values from probes. Historical keep-alive timer values can be used to keep track of changes to inactivity timer values set by a connection (e.g., a connection can set a shorter inactivity timer value during peak usage hours, a connection can set a shorter inactivity timer value during holidays, or other patterns).

In one embodiment, the service platform 103 includes a probe platform 107. The probe platform 107 can determine optimal keep-alive timer values for a UE 101 depending on the communication network serving the UE 101. In one embodiment, the probe platform 107 maps GGSN timer values based on a MCC or MNC. The MCC and MNC values can identify a network provider or a location associated with the connection of the UE 101. In one embodiment, this information can be used to map a connection to an operator. In some embodiments, the equipment and inactivity timing patterns can be determined through statistical analysis. In another embodiment, the probe platform 107 can map GGSN timer inactivity values based on cellular identifiers or the source internet protocol address determined from the request. In one embodiment, the probe platform 107 can map a gateway 113, NAT 115 or a combination of the two based on this information. In some embodiments, a combination of connection information is used to determine optimal keep-alive timer values for the UE 101.

In one embodiment, the service platform 103 receives a request for a keep-alive timer value for a specific network. The service platform 103 queries a probe database 123 to for information regarding the connection. In one embodiment, the probe database 123 knows the optimal keep-alive timer value for the communication network. In this embodiment, the service platform 103 initiates transmission of the optimal keep-alive timer value to the UE 101. In another embodiment, the probe database 123 has information about the earlier measurement data in that particular communication network, but the optimal keep-alive timer value is determined using some statistical analysis. In this embodiment, the probe platform 107 can receive current and historical probe values from a probe database 123. In one embodiment, the probe values include good probe values that represent probe values that have maintained a successful connection, and failed probe values that represent probe values that have been unsuccessful. In one embodiment, the probe platform 107 filters out the tail values of the good and failed probe values (e.g., filter out the greatest and lowest 10% of values). The probe platform 107 then calculates an average (e.g., median, mean, or other average) of the remaining good probe values. In one embodiment, average value can represent the optimal keep-alive timer value. In another embodiment, the probe platform 107 determines a minimum value of the failed probe values. If the average good probe value is shorter than the minimum fail probe value, the average value represents an optimal keep-alive timer value. Otherwise, the minimum fail probe value can represent the optimal. In yet another embodiment, the optimal keep-alive timer value can be multiplied with a safety multiplier to determine a safe optimal keep-alive timer value.

In another embodiment, the probe database 123 has statistical information about the connections from the determined communication network, but insufficient data to determine an optimal keep-alive timer value. In this embodiment, the probe platform 107 can select and transmit a safe keep-alive timer value to send the UE 101. The safe keep-alive timer value can be based on information known about the connection provider without specific mappings. In this embodiment, the UE 101 requesting the probe service can be used as a probe to gather information about the connection and keep-alive timer values, which succeed and which fails. In some embodiments, a connection can have sufficient data to determine an optimal keep-alive timer value at one time, but not have sufficient data at a later time due to a change in the service. The change in service can be reflected in an excessive number of failed probe notifications being received. In one embodiment, the communication networks having a good enough measurement data to determine the optimal keep-alive timer value are verified by requesting the UE 101 make a measurement for verification purpose if the latest measurement data is not current.

In one embodiment, the probe platform 107 can determine the regulate probe connections from clients. In this embodiment, the probe platform 107 can block or "blacklist" clients with certain identifiers that respond with incorrect probe values. In one embodiment, a client can be blacklisted if it consistently responds with probe values that are filtered out. In one embodiment, information the blacklisted clients respond with will not be used for determining optimal keep-alive timer values.

As shown in FIG. 1, the system 100 comprises a user equipment (UE) 101 having connectivity to the service platform via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101 and the service platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
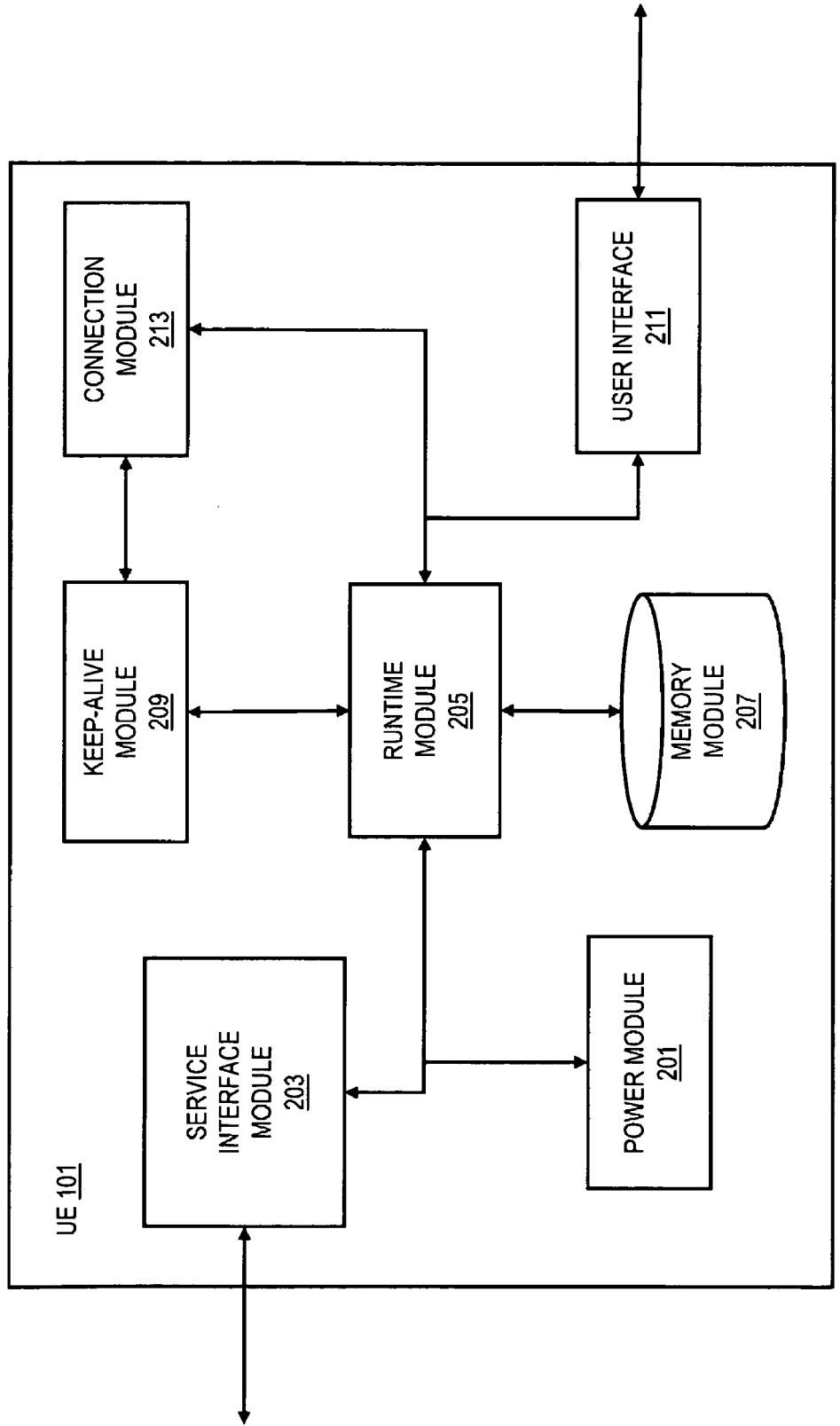
FIG. 2 is a diagram of the components of a user equipment that can utilize optimal keep-alive timer values, according to one embodiment.

FIG. 2 is a diagram of the components of an user equipment 101 that can utilize optimal keep-alive timer values, according to one embodiment. By way of example, the UE 101 includes one or more components for utilizing keep-alive timer values. It is contemplated that the functions of these components may be combined in one or more components or performed by other components of equivalent functionality. In this embodiment, the UE 101 includes a power module 201, a service interface module 203, a runtime module 205, a memory module 207, a keep-alive module 209, a user interface 211, and a connection module 213.

The power module 201 provides power to the UE 101. The power module 201 can include any type of power source (e.g., battery, plug-in, etc.). Additionally, the power module can provide power to the components of the UE 101 including processors, memory, and transmitters.

In one embodiment, the UE 101 includes a user interface 211. The user interface 211 can be used to display information to a user. The user interface 211 can be used to display an application 109 to a user. In one embodiment, the application 109 can utilize a service (e.g., messaging, e-mail, news feeds, etc.) that requires a connection to be continuously live.

In one embodiment, the UE 101 includes a service interface module 203. The service interface module 203 is used by a runtime module 205 to request and receive services from the service platform 103. In one embodiment some services (e.g., instant messaging, e-mail notification, news feeds, etc.) can require a continuous live connection. The application interface module 203 can use multiple communications technologies to communicate with a service platform 103. For example, the application interface module 203 can interface with the service platform 103 using a wireless local area network (WLAN), or a cellular network.

In one embodiment, the UE 101 can include a connection module 213. The runtime module 205 can use the connection module 213 to retrieve data (e.g., data regarding MCC, MNC, internet protocol address, a cellular identifier, gateway, etc.) about a connection device that the UE 101 is connected to. The information can be stored in a memory module 207. In one embodiment, the runtime module 205 relays this information to a probe platform 107 via the service interface module 203. In another embodiment, this information is used to request a keep-alive timer value from the probe platform 107. The probe platform 107 can determine an optimal keep-alive timer value for the UE 101 to use. The probe platform 107 can calculate this value using information from other UEs 101 utilizing services associated with the probe platform 107. In this embodiment, the runtime module 205 receives the keep-alive timer value and sets the value in a keep-alive module 209. The UE 101 uses the keep-alive timer value as its until the user leaves the network or another event occurs causing the UE 101 to request a new keep-alive timer value.

In one embodiment, the probe platform 107 can request the UE 101 to act as a probe to gather information about the connection. In one embodiment, the UE 101 performs a probing session requested by the probe platform 107. In this embodiment, the UE 101 requests a keep-alive timer value from the probe platform 107. The probe platform 107 returns a response including a request for the UE 101 to act as a probe and indicating a keep-alive timer value. In one embodiment, this value is a probe value used by the probe platform 107 to gather information. In this embodiment, the keep-alive module 209 can set a keep-alive timer value as instructed by the probe platform 107. The keep-alive module 209 can then wait a period corresponding to the keep-alive timer value and then send another request for an updated keep-alive timer value. The probe platform 107 can respond with an updated keep-alive timer value that increases the timer period. The runtime module 205 updates the keep-alive module 209 timer value. In one embodiment, the keep-alive module 209 waits the period and attempts another request for an updated keep-alive timer value. In this embodiment, the connection has been dropped by one of the devices 113, 115 or 117 on the route. The runtime module 205 waits a timeout period and then sets up a new connection and sends another request for an updated keep-alive timer value while reporting the connection failure. The probe platform 107 or the runtime module 205 then decreases the keep-alive timer value period. The process is followed until the maximum successful keep-alive time value and minimum failed one are found and it is not needed to update the keep-alive timer period any longer. The determination can be from a set number of probing iterations (e.g., 10 iterations), or after a standard is met (e.g., a good timeout period following a decrease in keep-alive timer value because of a failed keep-alive timer value). The runtime module 205 can transmit information about the good keep-alive timer values and failed keep-alive timer values back to the probe platform 107, which may store the values in a probe database 123.

Figure 3:
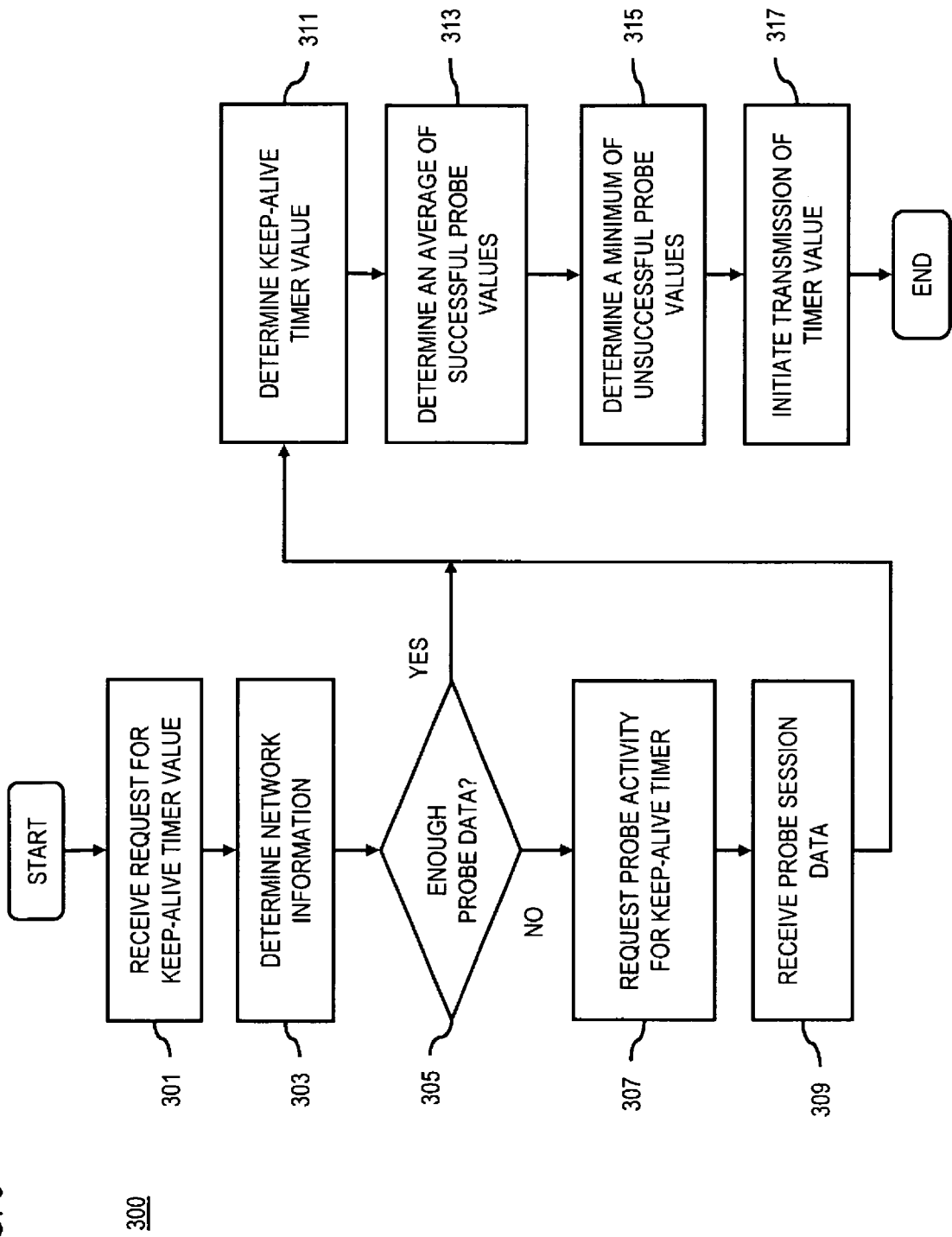
FIG. 3 is a flowchart of a process for utilizing optimal keep-alive timer values, according to one embodiment.

FIG. 3 is a flowchart of a process for obtaining optimal keep-alive timer values, according to one embodiment. In one embodiment, a probe platform 107 performs the process 300 and is implemented in, for instance, a chip set including a processor and a memory as shown FIG. 5. In step 301, the probe platform 107 receives a request from a UE 101 for a keep-alive timer value. In one embodiment, the UE 101 initiates the request when served by a communication network such as a cellular, WiMAX, or satellite network, but not when connected via Wifi.

At step 303, the probe platform 107 determines network information associated with the request. In one embodiment, the request specifies network information related to a network serving the user equipment. In one embodiment, network information includes information used to identify a connection (e.g., a MCC, a MNC, an internet protocol source address, a cellular identifier, a gateway, etc).

At step 305, the probe platform 107 determines if there is adequate probe data to determine the optimal keep-alive timer value. In one embodiment, there is adequate probe data if there has been at least a set number of probing sessions for the connection identified by the network information. In this embodiment, the set number can be a configuration parameter set in a probe database 123. In one embodiment, each UE 101 that requests probe information is asked to complete a probe session until adequate probe data is obtained.

At step 307, if there is inadequate probe data, the probe platform 107 returns a safe value for the keep-alive time to be used by the applications (e.g. messaging) as a temporary value before the optimal value is found and requests the UE 101 to perform a measurement. In this embodiment, the UE 101 performs a probing session. At step 309, the probe platform 107 receives session data from the probing session once the probing session is completed. In one embodiment, the probe platform 107 can use a starting probe value associated with the network information. In this embodiment, the probing session can yield data about successful keep-alive timer probe values and unsuccessful keep-alive timer probe values. In one embodiment, the values are stored in a probe database 123. In another embodiment, the probe platform 107 initiates transmission to inform the UE 101 of a keep-alive timer value based on this information. In yet another embodiment, the probe platform 107 determines an optimal keep-alive timer value for the UE 101.

At step 311, the probe platform 107 determines the requested keep-alive timer value based on the communication network information. In one embodiment, the probe platform 107 parses the network information to map gateways based on MCC, MNC, source internet protocol address, or cell identifiers. In another embodiment, the probe platform 107 determines network information based on global positioning system (GPS) coordinates. In this embodiment, the probe platform 107 can track networks associated with certain GPS coordinates and store the associated GPS coordinates in a probe database 123. In other embodiments, the network information can be used to map the UE 101 to a network. In one embodiment, the probe platform 107 associates the UE 101 with a particular GGNS. The probe platform 107 then determines an optimal keep-alive timer value associated with that gateway or other network information mapping. The optimal keep-alive time value may have been obtained from the service provider. When it is not possible to obtain the optimal keep-alive value in that way, it may be determined statistically.

The probe platform 107 queries a probe database 123 for successful and unsuccessful probe values. Successful probe values and unsuccessful probe values can be received from a plurality of UEs 101 that are associated with the network information mapping and stored in the probe database 123. In one embodiment, the plurality of UEs 101 can have common network information. In one embodiment, the probe platform 107 filters these probe values to remove outlying values that could introduce error into the determination.

At step 313, probe platform 107 determines an average of successful probe values associated with the network information mapping. The average could be a median, a mean, or other statistical model. In one embodiment, this average successful value is an optimal keep-alive timer value. In another embodiment, more calculations are involved in the determination.

At step 315, the probe platform 107 determines a minimum unsuccessful value of the unsuccessful probe values. The unsuccessful probe values represent a maximum keep-alive timer value that had become disconnected. The minimum unsuccessful value represents a keep-alive timer value close to an optimal value. In one embodiment, the minimum unsuccessful value is determined from values that have been filtered to eliminate outlier values. In one embodiment, the optimal keep-alive timer value is a statistical determination (e.g., an average, a weighted average, etc.) of the average successful value is lower than the minimum unsuccessful value. In another embodiment, the optimal keep-alive timer value is the minimum unsuccessful value modified by a safety parameter. The safety parameter can be, for example, a value that the minimum unsuccessful value is multiplied by to determine a safe value, as the minimum unsuccessful value may not be safe because it is known to fail. In another embodiment, the safety parameter can be an average of the average successful value and the minimum unsuccessful value. At step 317, the probe platform 107 initiates transmission of an optimal keep-alive timer value based on its determination.

With the above approach, a UE 101 can use services from a service platform 103 that require a continuous connection with optimal keep-alive parameters determined by a probe platform 107. Because the optimal keep-alive parameter is determined by the probe platform 107, each UE 101 does not have to separately attempt to discover the keep-alive timer value. In this manner, the UE 101 can rely on data gathered by other UEs 101. Because the probe platform 107 determines the keep-alive parameter based on network information associated with the UE 101 and other UEs 101, the keep-alive timer value is tailored to the UE 101 served by the specific communication network. The optimal keep-alive parameter keeps the UE 101 connected to the network with fewer unnecessary keep-alive transmissions, thereby saving battery life.

The processes described herein for providing an optimal keep-alive timer value may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof Such exemplary hardware for performing the described functions is detailed below.

Figure 4:
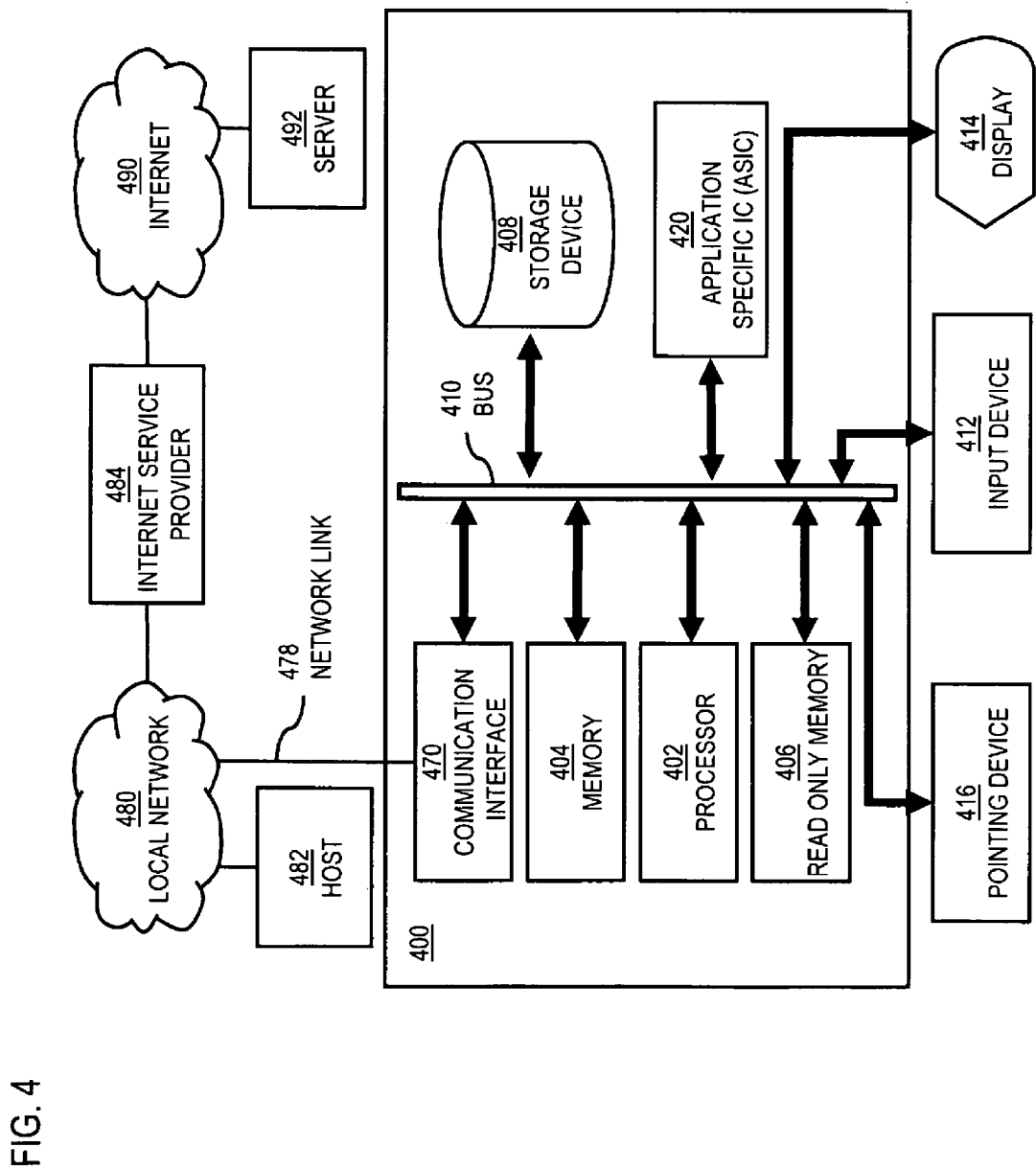
FIG. 4 is a diagram of hardware that can be used to implement an embodiment of the invention.

FIG. 4 illustrates a computer system 400 upon which an embodiment of the invention may be implemented. Computer system 400 is programmed (e.g., via computer program code or instructions) to provide an optimal keep-alive timer value as described herein and includes a communication mechanism such as a bus 410 for passing information between other internal and external components of the computer system 400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 410 includes one or more parallel conductors of information so that information is transferred quickly among devices coupled to the bus 410. One or more processors 402 for processing information are coupled with the bus 410.

A processor 402 performs a set of operations on information as specified by computer program code related to providing an optimal keep-alive timer value. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 410 and placing information on the bus 410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 400 also includes a memory 404 coupled to bus 410. The memory 404, such as a random access memory (RAM) or other dynamic storage device, stores information including processor instructions for providing an optimal keep-alive timer value. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of processor instructions. The computer system 400 also includes a read only memory (ROM) 406 or other static storage device coupled to the bus 410 for storing static information, including instructions, that is not changed by the computer system 400. Some memory is composed of volatile storage that loses the information stored thereon when power is lost. Also coupled to bus 410 is a non-volatile (persistent) storage device 408, such as a magnetic disk, optical disk or flash card, for storing information, including instructions, that persists even when the computer system 400 is turned off or otherwise loses power.

Information, including instructions for providing the optimal keep-alive timer value, is provided to the bus 410 for use by the processor from an external input device 412, such as a keyboard containing alphanumeric keys operated by a human user, or a sensor. A sensor detects conditions in its vicinity and transforms those detections into physical expression compatible with the measurable phenomenon used to represent information in computer system 400. Other external devices coupled to bus 410, used primarily for interacting with humans, include a display device 414, such as a cathode ray tube (CRT) or a liquid crystal display (LCD), or plasma screen or printer for presenting text or images, and a pointing device 416, such as a mouse or a trackball or cursor direction keys, or motion sensor, for controlling a position of a small cursor image presented on the display 414 and issuing commands associated with graphical elements presented on the display 414. In some embodiments, for example, in embodiments in which the computer system 400 performs all functions automatically without human input, one or more of external input device 412, display device 414 and pointing device 416 is omitted.

In the illustrated embodiment, special purpose hardware, such as an application specific integrated circuit (ASIC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a one-way or two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends or receives or both sends and receives electrical, acoustic or electromagnetic signals, including infrared and optical signals, that carry information streams, such as digital data. For example, in wireless handheld devices, such as mobile telephones like cell phones, the communications interface 470 includes a radio band electromagnetic transmitter and receiver called a radio transceiver. In certain embodiments, the communications interface 470 enables connection to the communication network 105 for providing an optimal keep-alive timer value to the UE 101.

The term computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Figure 5:
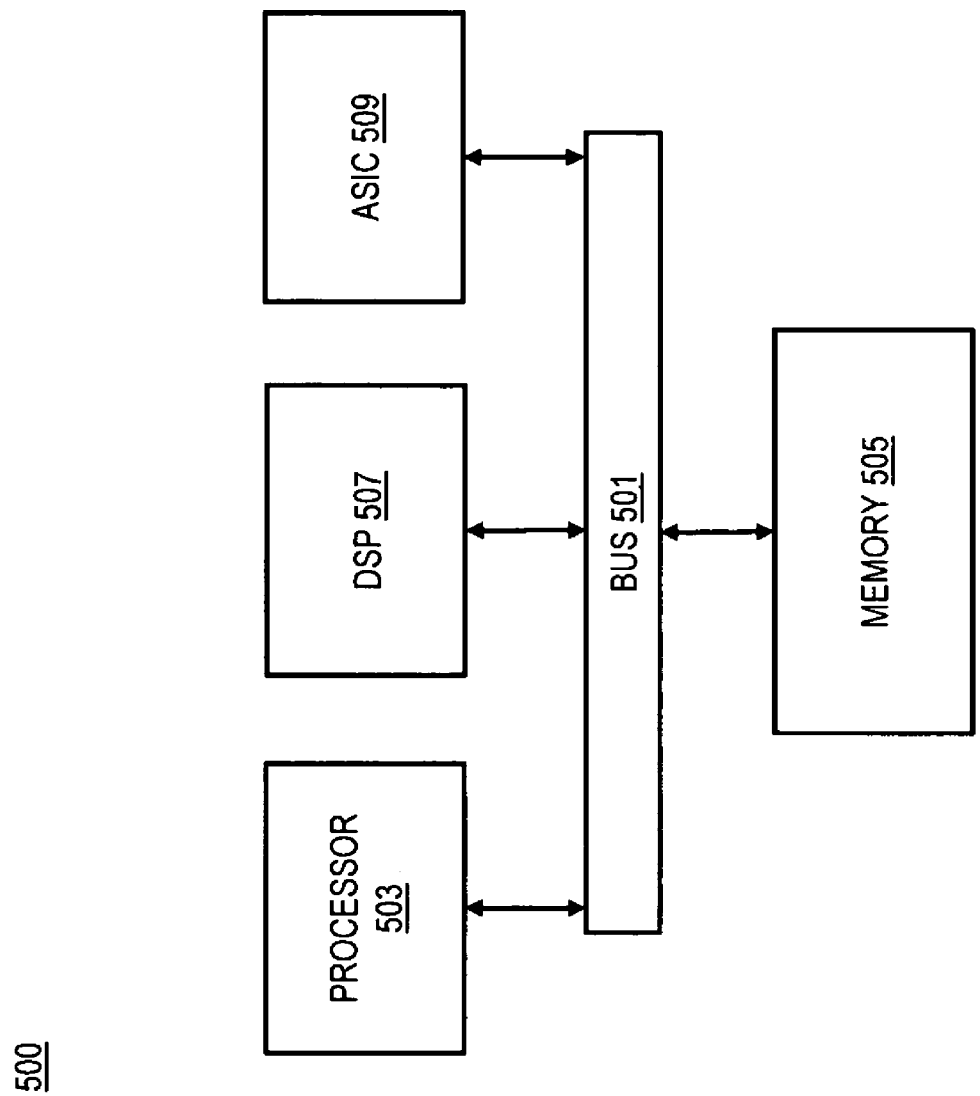
FIG. 5 is a diagram of a chip set that can be used to implement an embodiment of the invention.

FIG. 5 illustrates a chip set 500 upon which an embodiment of the invention may be implemented. Chip set 500 is programmed to provide an optimal keep-alive timer value as described herein and includes, for instance, the processor and memory components described with respect to FIG. 4 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 500 includes a communication mechanism such as a bus 501 for passing information among the components of the chip set 500. A processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 503 and accompanying components have connectivity to the memory 505 via the bus 501. The memory 505 includes both dynamic memory (e.g., RAM, magnetic disk, writable optical disk, etc.) and static memory (e.g., ROM, CD-ROM, etc.) for storing executable instructions that when executed perform the inventive steps described herein to provide an optimal keep-alive timer value. The memory 505 also stores the data associated with or generated by the execution of the inventive steps.

Figure 6:
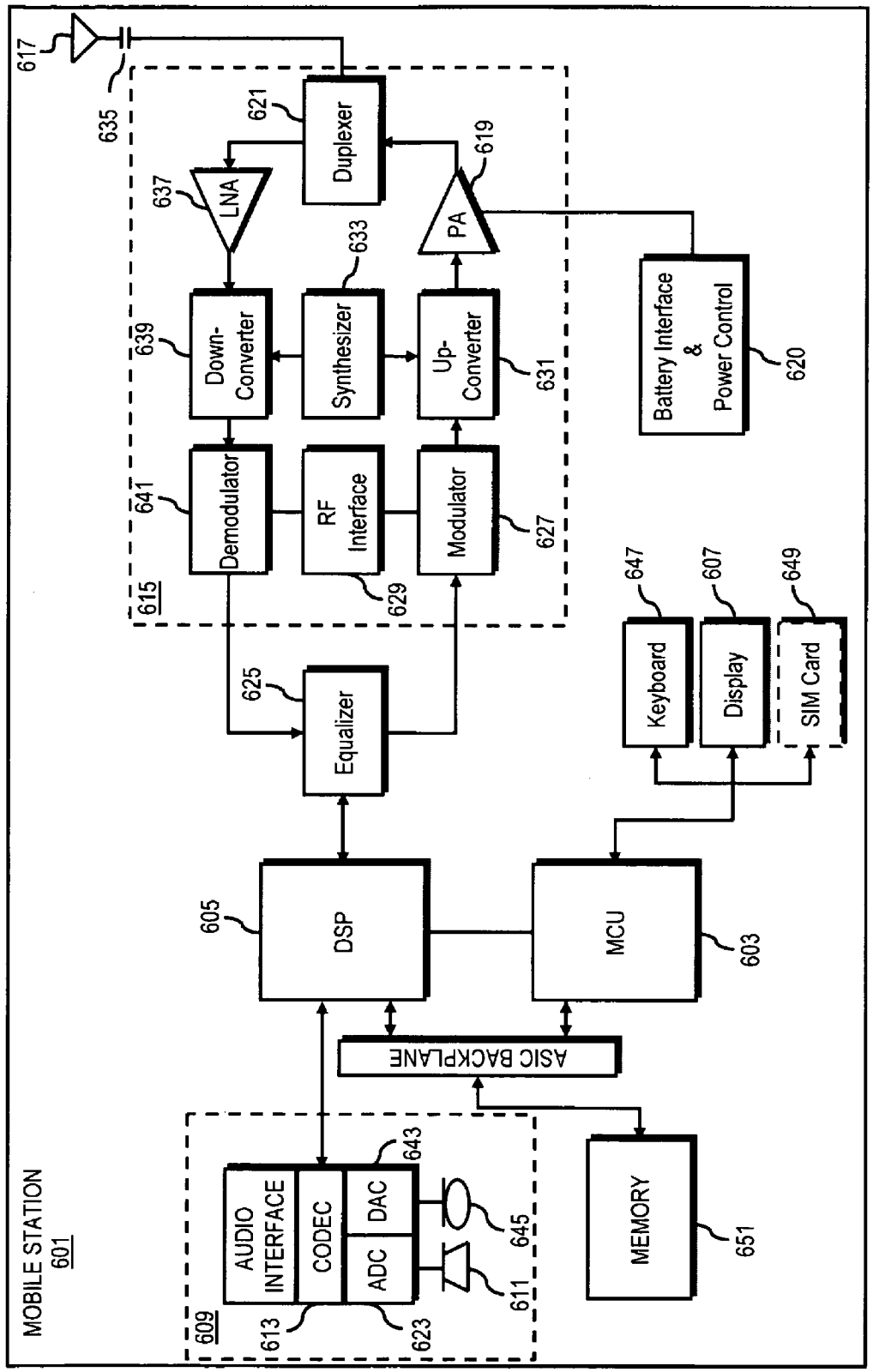
FIG. 6 is a diagram of a mobile station (e.g., handset) that can be used to implement an embodiment of the invention.

FIG. 6 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 603, a Digital Signal Processor (DSP) 605, and a receiver/transmitter unit including a microphone gain control unit and a speaker gain control unit. A main display unit 607 provides a display to the user in support of various applications and mobile station functions that offer automatic contact matching. An audio function circuitry 609 includes a microphone 611 and microphone amplifier that amplifies the speech signal output from the microphone 611. The amplified speech signal output from the microphone 711 is fed to a coder/decoder (CODEC) 613.

A radio section 615 amplifies power and converts frequency in order to communicate with a base station, which is included in a mobile communication system, via antenna 617. The power amplifier (PA) 619 and the transmitter/modulation circuitry are operationally responsive to the MCU 603, with an output from the PA 619 coupled to the duplexer 621 or circulator or antenna switch, as known in the art. The PA 619 also couples to a battery interface and power control unit 620.

In use, a user of mobile station 601 speaks into the microphone 611 and his or her voice along with any detected background noise is converted into an analog voltage. The analog voltage is then converted into a digital signal through the Analog to Digital Converter (ADC) 623. The control unit 603 routes the digital signal into the DSP 605 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 625 for compensation of any frequency-dependent impairments that occur during transmission though the air such as phase and amplitude distortion. After equalizing the bit stream, the modulator 627 combines the signal with a RF signal generated in the RF interface 629. The modulator 627 generates a sine wave by way of frequency or phase modulation. In order to prepare the signal for transmission, an up-converter 631 combines the sine wave output from the modulator 627 with another sine wave generated by a synthesizer 633 to achieve the desired frequency of transmission. The signal is then sent through a PA 619 to increase the signal to an appropriate power level. In practical systems, the PA 619 acts as a variable gain amplifier whose gain is controlled by the DSP 605 from information received from a network base station. The signal is then filtered within the duplexer 621 and optionally sent to an antenna coupler 635 to match impedances to provide maximum power transfer. Finally, the signal is transmitted via antenna 617 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 601 are received via antenna 617 and immediately amplified by a low noise amplifier (LNA) 637. A down-converter 639 lowers the carrier frequency while the demodulator 641 strips away the RF leaving only a digital bit stream. The signal then goes through the equalizer 625 and is processed by the DSP 605. A Digital to Analog Converter (DAC) 643 converts the signal and the resulting output is transmitted to the user through the speaker 645, all under control of a Main Control Unit (MCU) 603—which can be implemented as a Central Processing Unit (CPU) (not shown).

The MCU 603 receives various signals including input signals from the keyboard 647. The keyboard 647 and/or the MCU 603 in combination with other user input components (e.g., the microphone 611) comprise a user interface circuitry for managing user input. The MCU 603 runs a user interface software to facilitate user control of at least some functions of the mobile station 601 to provide an optimal keep-alive timer value. The MCU 603 also delivers a display command and a switch command to the display 607 and to the speech output switching controller, respectively. Further, the MCU 603 exchanges information with the DSP 605 and can access an optionally incorporated SIM card 649 and a memory 651. In addition, the MCU 603 executes various control functions required of the station. The DSP 605 may, depending upon the implementation, perform any of a variety of conventional digital processing functions on the voice signals. Additionally, DSP 605 determines the background noise level of the local environment from the signals detected by microphone 611 and sets the gain of microphone 611 to a level selected to compensate for the natural tendency of the user of the mobile station 601.

The CODEC 613 includes the ADC 623 and DAC 643. The memory 651 stores various data including call incoming tone data and is capable of storing other data including music data received via, e.g., the global Internet. The software module could reside in RAM memory, flash memory, registers, or any other form of writable storage medium known in the art. The memory device 651 may be, but not limited to, a single memory, CD, DVD, ROM, RAM, EEPROM, optical storage, or any other non-volatile storage medium capable of storing digital data.

An optionally incorporated SIM card 649 carries, for instance, important information, such as the cellular phone number, the carrier supplying service, subscription details, and security information. The SIM card 649 serves primarily to identify the mobile station 601 on a radio network. The card 649 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a request from one of a plurality of user equipments for a keep-alive timer value;
   determining network information related to a network serving the one user equipment;
   receiving probe values from the plurality of user equipments, the probe values comprising successful probe values and unsuccessful probe values; and
   determining the keep-alive timer value based on a statistical analysis of the probe values.

2. A method of claim 1, wherein each of the plurality of user equipments are served by a same communication network.

3. A method of claim 1, wherein the network information comprises global packet radio service gateway support node information.

4. A method of claim 3, wherein the global packet radio service gateway support node information is an access point name.

5. A method of claim 1, wherein the network information comprises a mobile country code, a mobile network code, a source internet protocol address, or a combination thereof.

6. An apparatus comprising:
   at least one processor; and
   at least one memory including computer program code for one or more programs,
   the at least one memory and the computer program code configured to, with the at least one processor, cause the apparatus to perform at least the following,
   receive a request from one of a plurality of user equipments for a keep-alive timer value;
   determine network information related to a network serving the one user equipment;
   receive probe values from the plurality of user equipments, the probe values comprising successful probe values and unsuccessful probe values; and
   determine the keep-alive timer value based on a statistical analysis of the probe values.

7. An apparatus of claim 6, wherein each of the plurality of user equipments are served by a same communication network.

8. An apparatus of claim 6, wherein the network information comprises global packet radio service gateway support node information.

9. An apparatus of claim 8, wherein the global packet radio service gateway support node information is an access point name.

10. An apparatus of claim 6, wherein the network information comprises a mobile country code, a mobile network code, a source internet protocol address, or a combination thereof.

11. A non-transitory computer-readable storage medium carrying one or more sequences of one or more instructions which, when executed by one or more processors, cause an apparatus to perform at least the following:
    receive a request from one of a plurality of user equipments for a keep-alive timer value;
    determine network information related to a communication network serving the one user equipment;
    receive probe values from the plurality of user equipments, the probe values comprising successful probe values and unsuccessful probe values; and
    determine the keep-alive timer value based on a statistical analysis of the probe values.

12. A non-transitory computer-readable storage medium of claim 11, wherein the network information comprises global packet radio service gateway support node information.

13. A non-transitory computer-readable storage medium of claim 12, wherein the global packet radio service gateway support node information is an access point name.

14. A non-transitory computer-readable storage medium of claim 11, wherein the network information comprises a mobile country code, a mobile network code, a source internet protocol address, or a combination thereof.

* * * * *